(12) United States Patent
Vashisht et al.

(10) Patent No.: US 8,218,533 B2
(45) Date of Patent: Jul. 10, 2012

(54) TELEPHONE RECORDING AND STORING ARBITRARY KEYSTROKES SEQUENCE WITH REPLAY WITH A SINGLE STROKE

(75) Inventors: Vikas Vashisht, Naperville, IL (US); Anoop Tripathi, Lake Zurich, IL (US); Jaideep Abichandani, Carol Stream, IL (US); Hui Dai, Itasca, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 12/403,478

(22) Filed: Mar. 13, 2009

(65) Prior Publication Data

US 2009/0175270 A1  Jul. 9, 2009

Related U.S. Application Data (62) Division of application No. 10/959,621, filed on Oct. 5, 2004, now Pat. No. 7,526,081.

(51) Int. Cl.
*H04L 12/66* (2006.01)
*H04M 1/00* (2006.01)
*G06F 3/02* (2006.01)
*H04B 1/40* (2006.01)

(52) U.S. Cl. ........ 370/352; 345/184; 370/260; 370/271; 379/67.1; 379/211.02; 379/355.07; 379/419; 379/433.06; 455/74.1; 455/550.1; 455/564; 455/575.1; 705/39; 715/854

(58) Field of Classification Search .................. 345/184; 370/260, 271, 352; 379/67.1, 211.02, 355.07, 379/419, 433.06; 455/74.1, 550.1, 564, 575.1; 705/39; 715/854

See application file for complete search history.

(56) References Cited

U.S. PATENT DOCUMENTS

| | | | |
|---|---|---|---|
| 5,631,954 A * | 5/1997 | Evans et al. ................... | 370/271 |
| 6,125,285 A | 9/2000 | Chavez et al. | |
| 6,215,515 B1 | 4/2001 | Voois et al. | |
| 6,314,094 B1 | 11/2001 | Boys | |
| 6,567,675 B1 | 5/2003 | Rosen et al. | |
| 6,583,800 B1 * | 6/2003 | Ridgley et al. ................ | 715/854 |
| 6,618,039 B1 | 9/2003 | Grant et al. | |
| 6,628,644 B1 | 9/2003 | Nelson et al. | |
| 6,678,735 B1 | 1/2004 | Orton et al. | |
| 6,680,943 B1 | 1/2004 | Gibson et al. | |
| 6,731,630 B1 | 5/2004 | Schuster et al. | |
| 6,738,390 B1 | 5/2004 | Xu et al. | |
| 6,741,695 B1 | 5/2004 | McConnell et al. | |

(Continued)

OTHER PUBLICATIONS

3Com, "NBX Business Telephone Quick Reference Guide," 2 pages (Jul. 2003).

(Continued)

*Primary Examiner* — Gerald Gauthier (57) ABSTRACT

A telephone is described that allows any arbitrary combination of key strokes, including numerical keys, extension keys, as well as function keys such as TRANSFER, CONFERENCE, etc., to be programmed such that the entire sequence of key strokes can be recalled with the touch of a single button. The phone can be programmed directly by operation of the telephone user interface on the phone (i.e., the keys, phone display, and speaker prompting the user) and a program button dedicated to the feature of programming a separate programmable button to map to the specified key sequence. The feature can be implemented in advanced telephones capable of voice over Internet Protocol networks, and supporting the Session Initiation Protocol. In these more advanced phones, the programming can be done by a system administrator or by the user of the phone via a computer with internet access.

4 Claims, 4 Drawing Sheets

U.S. PATENT DOCUMENTS

| | | | |
|---|---|---|---|
| 6,741,853 B1 | 5/2004 | Jiang et al. | |
| 6,987,756 B1* | 1/2006 | Ravindranath et al. | 370/352 |
| 6,993,004 B2 | 1/2006 | Boys | |
| 7,139,370 B1 | 11/2006 | Tse | |
| 7,340,047 B2* | 3/2008 | Fijolek et al. | 379/211.02 |
| 7,526,081 B1* | 4/2009 | Vashisht et al. | 379/433.06 |
| 7,565,115 B2* | 7/2009 | Alexis | 455/74.1 |
| 2002/0087353 A1* | 7/2002 | Han | 705/1 |
| 2004/0008636 A1* | 1/2004 | Alexis | 370/260 |
| 2004/0018852 A1* | 1/2004 | Burke et al. | 455/550.1 |
| 2004/0222979 A1* | 11/2004 | Knighton | 345/184 |
| 2005/0277448 A1* | 12/2005 | Castaneda et al. | 455/575.1 |
| 2006/0135087 A1 | 6/2006 | Azzaro | |
| 2009/0175270 A1* | 7/2009 | Vashisht et al. | 370/352 |

OTHER PUBLICATIONS

3Com, "NBX Feature Codes Guide: Features Accessible by Button, Feature Codes, and Paging Codes," pp. 1-18 (Jul. 2003).

3Com, "NBX Telephone Guide," www.3Com.com (Sep. 2003).

Cisco Systems, Cisco "IP Phone Portfolio," 8 pages, 204079_ETMG_LF_06.04 (2004).

Avaya, "Enterprising with SIP—A Technology Overview [White Paper]," pp. 1-31 (Mar. 2004).

Avaya, "4600 Series IP Telephones, Overview, Features & Benefits," 4 pages (Sep. 1, 2004).

3Com, "Product Details 3Com 3102 Business Phone, Features, Benefits & Specifications," www.3com.com/products/en_US/detail... (Sep. 1, 2004).

* cited by examiner

TELEPHONE RECORDING AND STORING ARBITRARY KEYSTROKES SEQUENCE WITH REPLAY WITH A SINGLE STROKE

RELATED APPLICATIONS

This application is a divisional of U.S. patent application Ser. No. 10/959,621 filed Oct. 5, 2004, now U.S. Pat. No. 7,526,081 incorporated by reference herein.

BACKGROUND OF THE INVENTION

A. Field of the Invention

This invention relates to the field of telephones and more particularly to a programmable phone has a means for performing complex operations with the phone with a single key press.

B. Description of Related Art

Telephones used in businesses today may have one or more programmable buttons that provide features such as a speed dial for frequently called phone numbers. Examples of such phones are the 3Com NBX 3102 telephone from 3Com Corporation, the assignee of the present invention. Such phones now are beginning to support Voice over Internet Protocol networks (VoIP) technology and other advanced services and features. The 3Com NBX 3102 is one such phone. Other examples of business phones in the state of the art are the Avaya 4600 Series IP Telephones and the Cisco Systems IP Phones having model numbers 7940, 7960 and the 7970G.

Despite the advances in the telephony art and in particular in business telephones, complex operations using the telephone still require the user to provide multiple key press operations in order for the operations to execute. For example, consider a phone that functions as a switchboard that is answered by a receptionist. To transfer the call to party A, he or she may have to press the TRANSFER key and then the extension key for the person to whom the call should be transferred. As another example, a user may want to establish a conference call with a particular party, and to establish the conference call they may have to press the CONFERENCE key, dial the extension, and press CONFERENCE again. In these circumstances, the phones still require the use to press a function key (CONFERENCE, TRANSFER, VOICE MAIL TRANSFER, etc.), in addition to an extension button or, worse yet, one or more digits.

User interface devices for telephones and related equipment are described in Voois, U.S. Pat. No. 6,215,515; Chavez, Jr., U.S. Pat. No. 6,125,285; and Grant et al., U.S. Pat. No. 6,618,039. The art has lacked a telephone that provides universal programming capability together with one-touch replay of any arbitrary combination of function, extension, digit or other key strokes. This invention meets that need.

SUMMARY OF THE INVENTION

This invention provides a more versatile approach to programming a telephone that allows any arbitrary combination of button strokes (including numerical buttons, extension buttons, as well as function buttons) to be programmed such that the entire sequence of button strokes can be recalled with the touch of a single button (the "mapped" button herein). The phone can be programmed directly by the telephone user interface (TUI) on the phone, i.e., the keys, phone display, speaker, and a program button dedicated to the feature of programming other program buttons to map to any specified key sequence.

An example of the implementation of this invention would be a telephone used by a receptionist, and programming one of the programmable buttons to store the complex button stroke sequence of TRANSFER, 102, and TRANSFER (a total of 5 strokes, including two function button strokes and 3 digit button strokes). Any time the receptionist receives a call that is supposed to be transferred to extension 102, they simply press the one button that is mapped to transferring calls to extension 102. Thus, only one press of a button is required in stead of 5.

The invention can be implemented in simple telephone devices that have a programmable button. Preferably a plurality of buttons are provided (e.g., 4 or 8 or more programmable buttons), and the user is provided with the option to program one or more than one of the buttons to simulate complex key stroke patterns, perhaps leaving the rest of the buttons for more traditional uses of programmable buttons such as speed dial numbers. The phone will include a users guide that explains to the user how to program the button stroke sequence. The phone will also typically have a guide or template next to the button that explains the operation that has been programmed for that button.

The invention can also be implemented in more complex and sophisticated telephones, such as for example the ones listed above or later generations of such phones, including phones that use VoIP technology and the Session Initiation Protocol (SIP) to initiate, conduct and terminate communication sessions. In these circumstances, the execution of the complex operation associated with the key strokes may involve equipment or entities that are located remotely from the telephone, such as a SIP proxy server serving a plurality of SIP phones for a particular telephone system (e.g., an enterprise phone system) and a back end server storing programmed button strokes. In this example, the phone can send the captured key sequence for the programmed button to a SIP proxy server, which forwards the key sequence to a back-end server maintaining a database of user profiles (including programmed button functions and other user information, e.g., IP address, user identification, extension number, etc.) for all the phones in the system. This information could be sent from the phone to the SIP proxy server in a SIP REGISTER message or other message at the time the phone is programmed. The button stroke sequence is forwarded to the back-end server for storage in a database.

Preferably the phone and the database are also synced with the SIP REGISTER messages on a pre-configured interval (e.g., every hour or every day) and at boot time, e.g., when the phone is booted up from cold or from a suspend mode.

In an embodiment where the phone is network accessible (e.g., has a SIP address or IP address), the system administrator could program the button remotely. The user preferably can also program the phone either directly via the TUI on the phone, or remotely via any computing device supporting Internet access. In one possible embodiment, an Internet provisioning interface is integrated with the back-end server so that users can remotely program their telephones e.g., from home using their home computer.

These and other details on the invention will be described in further detail in the following description and with reference to the appended drawings.

DETAILED DESCRIPTION OF THE PREFERRED EMBODIMENT OF THE INVENTION

Figure 1:
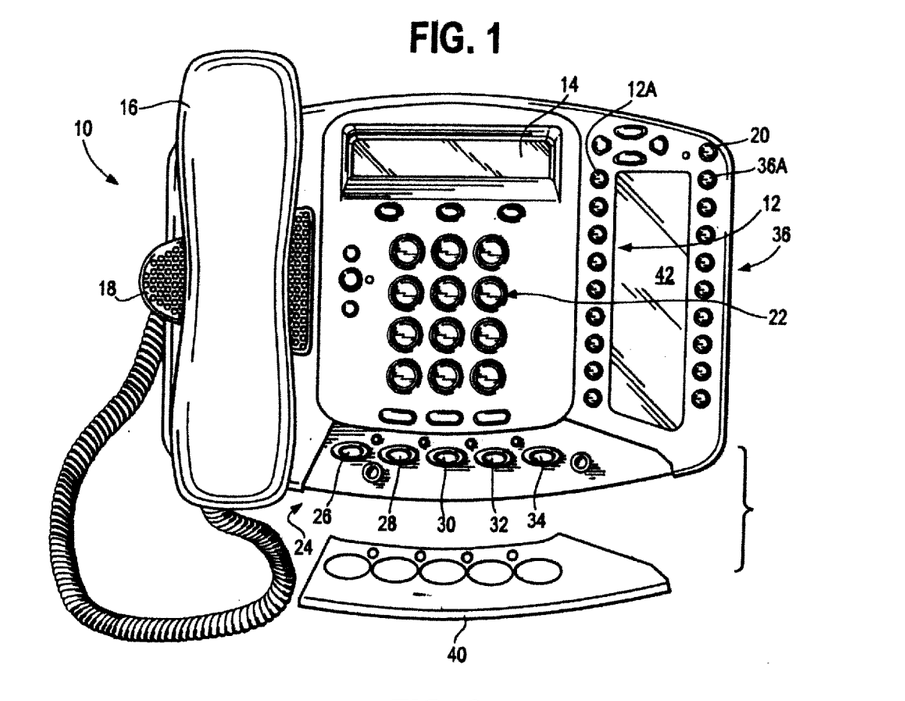
FIG. 1 is an illustration of a typical business telephone with programmable buttons that can be programmed in accordance with the features of the present invention.

Referring now to FIG. 1, a typical business telephone 10 is shown with one or more programmable mapped buttons 12 that can be programmed in accordance with the features of the present invention. The telephone 10 includes a telephone user interface including a screen display 14, handset 16 and a speaker 18. The telephone user interface further includes a program button 20, digit buttons 22, and one or more function buttons 24 associated with telephone functions, including a speaker phone button 26, redial button 28, conference button 30, transfer button 32 and a hold button 34. The phone also includes extension buttons 36 for other extensions in the office or organization where the phone 10 is installed. The telephone is constructed and arranged with suitable processing hardware and software wherein the program button 20 permits a user to program a programmable mapped button 12 to invoke an arbitrary sequence of button strokes selected by the user. More than one mapped button 12 can be provided, such as four or eight or more. The arbitrary sequence of button strokes will typically include at least one function button 24 and at least one digit button 22 or extension button 36.

For example, the user may program the mapped button 12A such that it maps to the sequence TRANSFER (button 32) and EXTENSION 1 (button 36A). After programming the mapped button 12A in this fashion, the sequence of button strokes TRANSFER and EXTENSION 1 is invoked by pressing the mapped button 12. As another example, the user could program the mapped button 12A to the sequence CONFERENCE (button 30), 1 425 304 9771, CONFERENCE, to initiate a conference call with a party at telephone number 1 425 304 9771.

The phone includes a cover 40 that snaps over the function buttons 24 with legends to indicate the function of each button. Also, cover or template is placed in the region 42 that allows the user to indicate the sequence of actions associated with the programmable mapped buttons 12.

Figure 2:
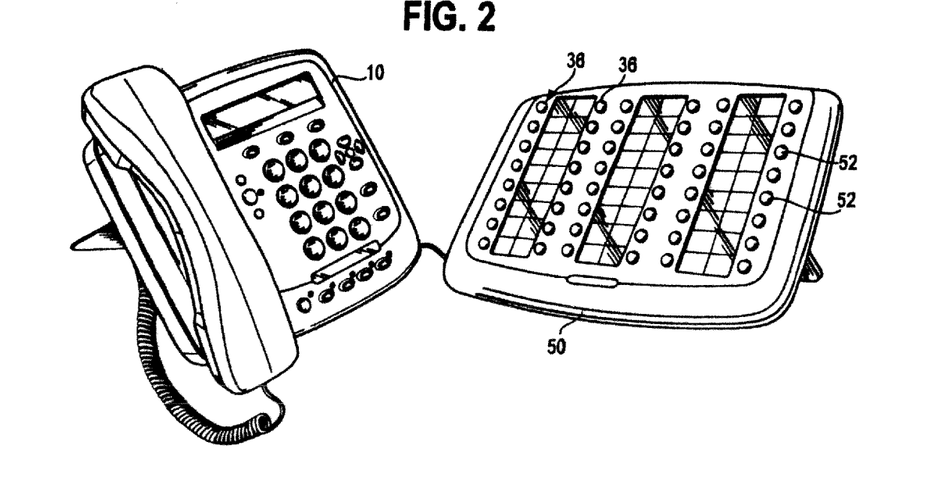
FIG. 2 is an illustration of a telephone attendant console and attached telephone that can be programmed in accordance with the features of the present invention.

FIG. 2 shows an embodiment in which the telephone 10 comprises an attendant phone system for use by a telephone attendant. The phone 10 is attached to an attendant console 50 which includes a plurality of extension buttons. The right hand column of buttons 52 could be used as programmable mapped buttons to map the sequence TRANSFER and Extension 1, TRANSFER and Extension 2, etc., so that the attendant can effectuate transfers to the most frequently dialed parties with a touch of a single button.

In a preferred embodiment, the telephone 10 supports SIP protocol and voice over Internet Protocol telephony. An example of an environment in which such phones could be used is shown diagrammatically in FIG. 3. An enterprise, such as a small or mid-size business, or a branch office of a larger enterprise, is shown by the dashed line 60. The enterprise 60 has a local area packet switched network 61 to which are connected telephones 10A and 10B and an attendant console 10C. In this scenario, the phones 10A, 10B, and attendant phone 10C contain programmable mapped buttons and a program button enabling any arbitrary sequence of button strokes to be mapped to a single mapped button.

Figure 3:
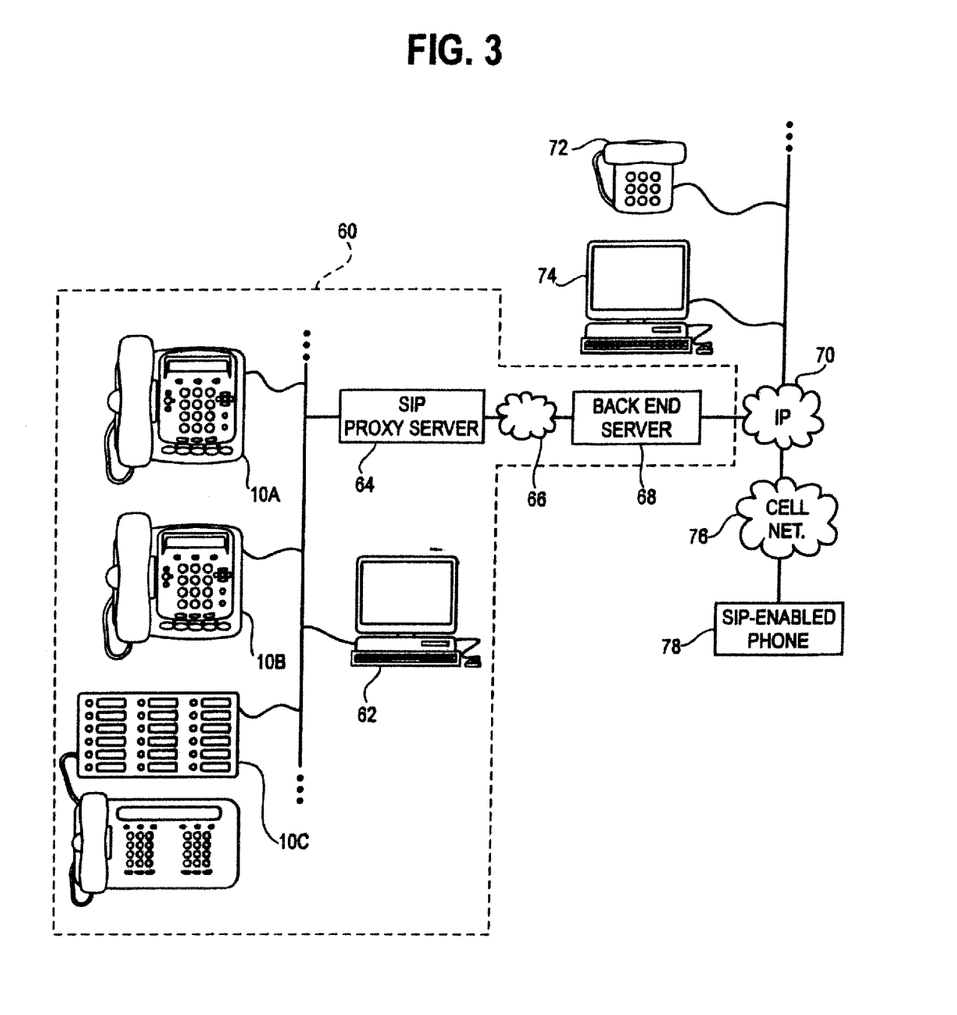
FIG. 3 is block diagram of an IP telephony environment in which the invention can be practiced, showing a set of programmable phones, a SIP Proxy Server, a back-end server and remotely located telephones that can send and receive calls to and from the programmed telephones of FIGS. 1 and 2.

The phones 10A, 10B and 10C initiate and receive telephone calls over the network 61 using SIP signaling techniques, including SIP REGISTER messages. SIP messages are sent from the phones 10 to a SIP proxy server 64 in accordance with the teachings of the SIP protocol. In one possible embodiment, when the user programs their phone 10 in accordance with the teachings of this invention, the phone 10 sends information as the programmed sequence of button strokes and the mapped key associated with the programmed sequence via a SIP REGISTER message to the SIP proxy server. The SIP proxy server 64 forwards the SIP REGISTER message to a back-end server 68. The back-end server 68 maintains a user profile database for the users of the telephone system and stores the new programmed sequence and the mapped key in the database memory.

The back-end server 68 and SIP proxy server 64 are shown as separate devices in FIG. 3 but this is not necessary. In particular, the SIP proxy server could be integrated with the back-end server. When a user of the phone 10A wishes to initiate a communication with another SIP enabled device, the SIP message exchange occurs via the SIP proxy server 64, back-end server 68 and over an Internet Protocol network 70 to the SIP-enabled phone that is the intended recipient. This recipient could be a computer 74 with a telephone application, another business phone 72 supporting SIP protocol and voice over Internet Telephony, or the call could be routed through a cellular telephone network 76 and cellular infrastructure to a SIP-enabled wireless telephone 76. The details on the exchange of SIP messages to support voice over Internet Telephony and SIP are known in the art. Reference is made to the following background references, the content of which is incorporated by reference herein: Request for Comments (RFC) 2543-Session Initiation Protocol, M. Handley et al., March 1999; *Enterprising with SIP, A Technology Overiew*, White Paper, Avaya Inc. February 2004; See also the following patents showing the state of the art: Orton et al., U.S. Pat. No. 6,678,735; Gibson et al., U.S. Pat. No. 6,680, 943; Xu et al., U.S. Pat. No. 6,738,390; McConnell, U.S. Pat. No. 6,741,695 and Jiang et al., U.S. Pat. No. 6,741,853 (see also col. 14 lines 4 et seq. describing a data entry service using shortcut keys which are interpreted by "wireless portal middleware").

Figure 4:
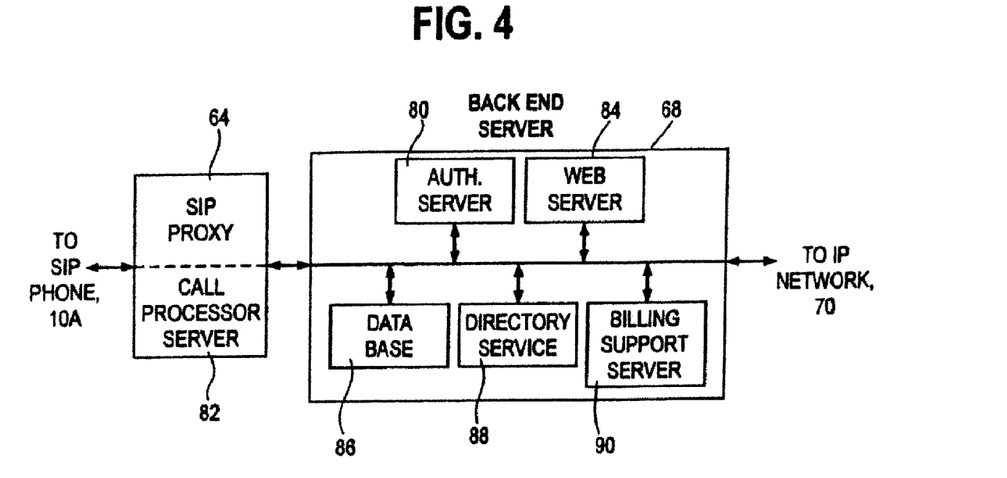
FIG. 4 is a more detailed illustration of the back-end server of FIG. 3, in an embodiment in which the functions of the SIP Proxy server are combined with a call processor server.

As shown in FIG. 4, the back-end server 68 is shown in block-diagram form. The SIP proxy server 64 is combined with a call processor server 82 as described below. The back-end server in the illustrated embodiment comprises a collection of several servers, including an authentication and authorization server 80, a web server 84 providing internet access for terminals on the enterprise network and supporting web provisioning of programming functions as described herein; a database 86 for storing user profiles for the telephone users at the enterprise, a directory server 88 providing directory services for the enterprise, and a billing support server 90 that supports billing and accounting functions for the enterprise phone system. Back-end servers for enterprise SIP/VoIP telephone systems are known in the art and commercially available, see e.g., the VCX5.0 telephone system from 3Com Corporation.

In the embodiment of FIG. 4, the call processor server 82 (call controller) runs in the same chassis as the SIP proxy server 64. It is also possible to have the call processor server running in the back end server 68 for relatively low capacity environments. In other embodiments, particular high capacity applications such as headquarters and large branch offices, the call processor server 82 may be implemented in a separate chassis or device 82 and integrated with SIP proxy server functions as shown in FIG. 4. The call processor 82 typically communicates with the back end server via proprietary messaging formats that are unique to the vendor or the equipment, but use of standardized messaging formats is possible.

Referring to FIGS. 1 and 4, the phone 10 exchanges messages via the SIP proxy server and/or the call processor 82. The call processor 82 exchanges messages with the authorization server 80. The user can program the mapped buttons 12 remotely through the web provision feature in the web server 84 using a standard web browser such as Internet Explorer and any computing device with internet access. The changes to the user profile including newly programmed mapped buttons are stored in the database 86. Alternatively, the user can program the mapped button using the telephone user interface, in which case the information as to the button sequence and mapped button are passed via a SIP REGISTER message from the SIP proxy server and/or the call processor server 82, and the updated user profile is stored in the database 86.

The illustrated embodiment of the call processor server 82 provides distributed call to signaling and control. It includes a set of software-based components includes call control, session management, and device control functions for gateways and clients. These components mediate traffic between IP telephony networks using different protocols, enabling communications from disparate networks to reach their destination. The open standards-based call processor 82 supports the Session Initiation Protocol (SIP) specification, delivering both interoperability with other IP telephony networks and support for emerging protocols. The processor provides seamless integration of SIP and IP-based systems with many end-user devices, including all popular SIP phones. The system of FIG. 4 is not dependent on a particular manufacturer of the telephone and in fact that user programming of mapped buttons can be implemented independent of telephone hardware.

The call processor 82 translates a telephone number into an IP address (or DNS name) of the media gateway serving the specific calling area. It identifies legitimate users, centrally maintains access privileges and features that travel with a user for exceptional convenience, and offers a robust end-user and enterprise administrator web-based provisioning system.

The billing support server 90 of FIG. 4 provides a suite of software applications that helps analyze network performance and operation, and pinpoints customer calling patterns and inappropriate system use. Call detail records (CDRs) and other key mechanisms enable the call processor server 82 to serve as the bridge between the IP telephone network and the enterprise billing system. CDRs are generated at multiple times during a single call and unified into a single "super CDR" for a thorough account of telephone traffic. These comprehensive accounting services indicate successful and unsuccessful call attempts generated by end points, media gateways, or signaling elements of the system of FIG. 4.

The back-end server 68 further includes an enterprise management suite of software applications that enable full control over IP-based voice networks. Powerful yet simple-to use software provides up-to-the minute details and graphical network displays. The SNMP-based management tool maps devices and connections so network managers can easily monitor congestion, set thresholds and alerts, view network events, generate reports in user-defined formats, and launch device configuration tools. Automated operations, intelligent defaults, and the ability to provide suggestions for optimization when misconfigurations are detected make this application ideal for managers with varied levels of experience.

Figure 5:
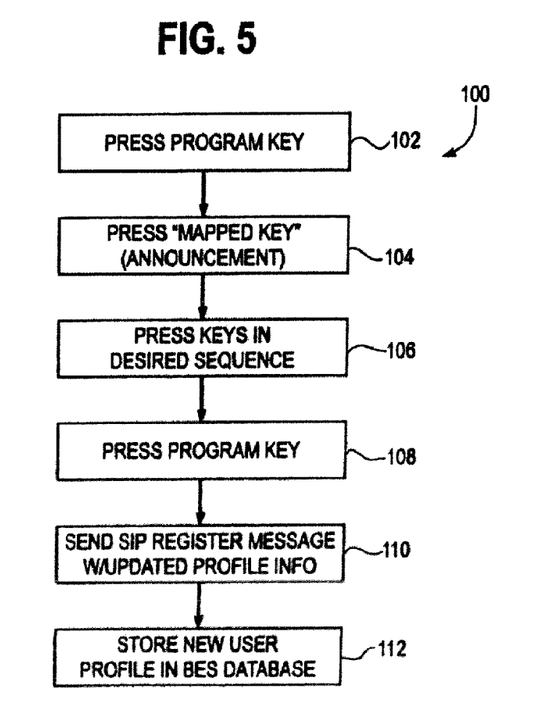
FIG. 5 is a flow chart showing the sequence of actions in programming a phone in accordance with the features of an embodiment of the invention in accordance with FIG. 3.

A method of programming a phone is shown in FIG. 5. The method 100 allows for programming a telephone to invoke any arbitrary sequence of button strokes selected by the user with a single press of a mapped button. The method is suitable for use in a phone such as the phone of FIG. 1 or FIG. 2, which includes a program button 20 and one or mapped buttons 12 which can be mapped to any arbitrary combination of button strokes, including function buttons 24, digit buttons 22 or extension buttons 36. The method includes the step of providing in the telephone 10, a program button 20 for programming the mapped button 12 to invoke the arbitrary sequence of button strokes. The term "program button" is intended to encompass either a dedicated hard button on the phone or, alternatively, a sequence of button strokes (e.g., #P) which invokes a programming function. The method continues, at step 102 with instructing the user to press the program button. This step could be by providing the instruction in the user manual, by a prompt appearing on the screen display 14, or by audible instructions over the handset 16. This action signifies that the user wishes to program one of the programmable mapped buttons 12.

Next, at step 104, the user is prompted to press the mapped button 12 that they wish to program.

Next, at step 106, the user is instructed to press a sequence of digit, extension, function or other buttons provided on the phone in any arbitrary sequence; the sequence to be associated with the mapped button 12 that they pressed at step 104. The sequence will typically include at least one digit and at least one non-digit button such as an extension button or a function button such as TRANSFER or CONFERENCE. The sequence can be any arbitrary sequence selected by the user.

Next, at step 108, the user is instructed to press a predetermined button (such as the program button 20) to indicate the end of the sequence.

At this point, the phone is programmed is a simple embodiment of the invention. In particular, the sequence is stored in memory local to the phone and when the phone is thereafter used, when the user presses the programmed mapped button 12, the phone interprets that press as invoking the programmed sequence, and the sequence is invoked.

One additional button that can be programmed is a virtual PAUSE button for a default length of time delay in the button sequence. When the phone sees the PAUSE button, the phone will "sleep" or pause for a default length of time (e.g., 5 seconds) and process the rest of the button strokes after the delay, This feature can be used in an application such as a calling card or bank access application where after the call is connected the user needs to wait for a period of time for the call to be answered before they enter their calling card number, an account code or number sequence, respond to any other voice prompt. So, the user could program the following sequence to be recalled with a single button: 779-0001, PAUSE 180738462335#, where 770-0001 is the bank phone number, PAUSE is the period in which the call is answered and the user is prompted to input their account number, and 180738462335# is the user account number followed by the # sign. The PAUSE command could be provided as a distinct button on the face of the phone, or alternatively by pressing a dedicated Feature button on the phone and then the digits corresponding to a feature code assigned to the PAUSE feature. For example, all the features such as TRANSFER, CONFERENCE, PAUSE, etc, could be accessed by pressing a FEATURE button and a corresponding three digit code assigned to each features. This ability to recall features and functions using a FEATURE button and digits assigned to specific functions solves the problem of not enough hardware buttons for functions on a basic phone model.

In the environment of FIGS. 3 and 4, several additional steps are performed in the method of FIG. 5. In particular, at step 110, a SIP REGISTER message is sent from the phone to the SIP proxy server 64 of FIG. 3 and the SIP REGISTER is forwarded to the back-end server 68. The SIP REGISTER includes the programmed button identification and the sequence of button strokes. This information is stored in the user profile database 86 of FIG. 4, as shown as step 112.

Figure 6:
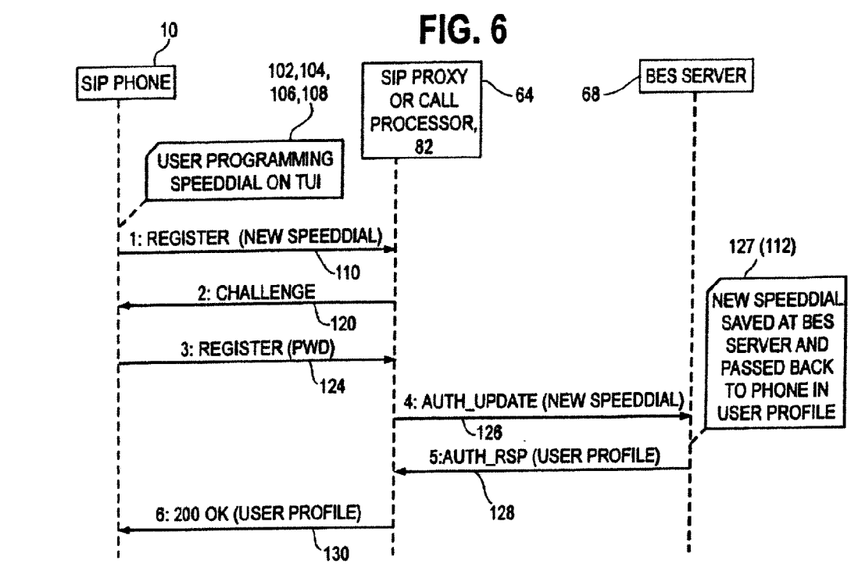
FIG. 6 is a message flow diagram showing the sequence of messages occurring when a user programs their phone with the telephone user interface.

FIG. 6 is a call flow diagram message flow diagram showing the sequence of messages occurring when a user programs their phone with the telephone user interface. The first step is the execution of method steps 102, 104, 108 and 108 of FIG. 6. Basically, the user programs the programmable mapped button on their phone. Then, a SIP REGISTER message is sent from the SIP phone 10 to the SIP proxy server 64 as shown at 110 (same as method step 110 of FIG. 5). This message includes the button sequence and the programmable button 12 that is associated with the sequence.

Then at step 2, a challenge message 120 is sent from the SIP proxy server to the SIP phone 110. This can be a 401 UNAUTHORIZED message under the SIP protocol, and basically challenges the phone for a password. At step 3, a SIP REGISTER message 124 with the user password is sent from the phone 10 to the SIP proxy server 64 and/or call processor server. This message may also contain the button sequence and the programmable mapped button information as well.

At step 4, the SIP proxy 64 sends an Auth_Update message 126 to the back end server 68. This message includes the username and password, the keystroke sequence and the programmable mapped button that was selected. Authentication of the user password occurs in the back-end server 68, e.g., using the authentication server 80.

The new programmed function (keystroke sequence and mapped button) is saved in the user profile database 86 in the back-end server 68 (step 112 of FIG. 5), and at step 127 a message is generated sending the user profile with the new programmed function.

The back-end server 68 sends a SIP Auth_Resp message 128 with the user profile to the SIP proxy 64. The SIP proxy then sends a SIP 200 OK message 130 to the phone 10, which contains the latest user profile contained in the message 128.

Figure 7:
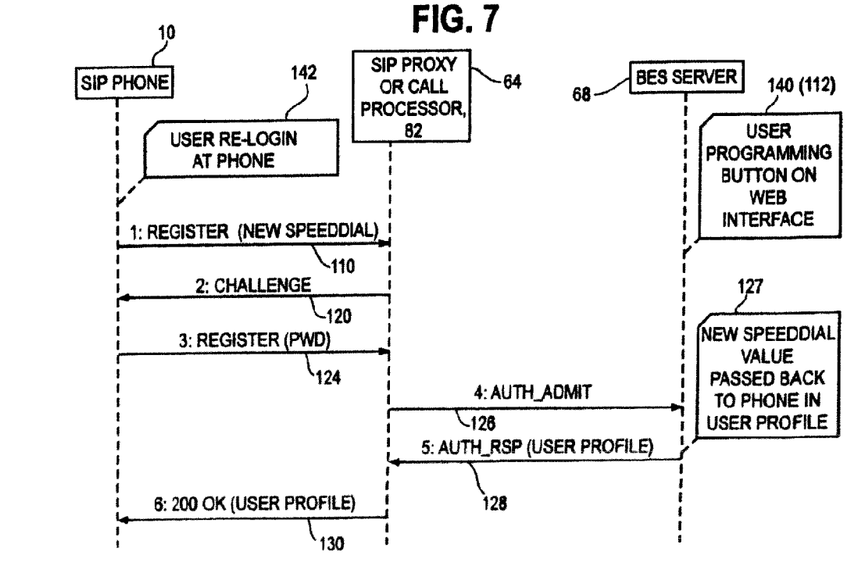
FIG. 7 is a message flow diagram showing the sequence of messages occurring when a user programs their phone via a web interface from any computer with internet access.

FIG. 7 is a message flow diagram showing the sequence of messages occurring when a user programs their phone via a web interface from any computer with internet access. As an example, the user may program the phone from home.

At step 140, the user accesses the web interface. After proceeding through suitable password or other authentication mechanisms, the user navigates to a menu or screen that shows their current user profile. The user is provided with the ability to program additional programmable mapped buttons using drop-down lists, dialog boxes, icons, or any other suitable technique, the details of which are not important. When they are finished and exit the web interface, the new information is saved in an updated user profile.

Then, at step 142, the user logs on to their phone (e.g., the next day when they are at the office). The message flow of messages 110, 120, 124, 126, 127, 128 and 130 proceeds as discussed above in conjunction with FIG. 6. In particular, the updated user profile is downloaded to the phone in steps 127, 128 and 130.

From the foregoing, it will be appreciated that we have described a method of programming a telephone 10, the telephone incorporated into a telephone system including a back-end server 68 communicating with the telephone, comprising: providing a web interface (via web server 84 in FIG. 4) wherein a user of a telephone in the system can remotely program their telephone via the web interface; programming, via the web interface, a mapped button on the telephone to invoke any arbitrary sequence of button strokes, the button strokes including at least one function button associated with the telephone and at least one digit or extension button; and storing information as to the sequence of button strokes and the mapped button in a memory associated with the back-end server, such as the database 86 in the server 68.

Preferably, the back-end server 68 and telephone 10 support a SIP and voice over Internet Protocol telephony.

It should be understood, of course, that the arrangements and processes described herein are set forth for purposes of example only, and other arrangements and elements (e.g., machines, interfaces, functions, orders of elements, etc.) can be added, combined or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Exemplary embodiments of the present invention have thus been illustrated and described. It will be understood, however, that changes and modifications may be made to the invention as described without deviating from the spirit and scope of the invention, as defined by the following claims.

The invention claimed is:

1. A telephony system comprising
a plurality of telephones, each telephone supporting a SIP protocol and voice over Internet Protocol telephony;
a SIP proxy server receiving SIP REGISTER messages from the plurality of telephones;
a back end server communicating with the SIP proxy server;
wherein each telephone comprises a telephone user interface comprising a plurality of buttons, the buttons including a program button, a programmable mapped button, digit buttons, and one or more function buttons associated with telephone functions;
wherein each telephone is constructed and arranged wherein the program button permits a user to program the programmable mapped button to invoke an arbitrary sequence of button strokes selected by the user, the arbitrary sequence of button strokes including at least one function button and at least one digit button or extension button, wherein, after programming the mapped button, the sequence of button strokes is invoked by pressing the mapped button;
and wherein after programming the mapped button a SIP message containing information as to the sequence is sent from the telephone to the proxy server and the sequence of button strokes is stored in a memory associated with the back end server.

2. The system of claim 1, wherein the back end server supports programming of each telephone by a computing device separate from the telephone via a web interface.

3. The system of claim 1, wherein the back end server periodically obtains mapped button information from each telephone.

4. The system of claim 1, wherein the back-end server stores mapped button information for each telephone in the system in a memory associated with the back-end server.

* * * * *